(12) United States Patent
Feenstra et al.

(10) Patent No.: US 11,358,015 B2
(45) Date of Patent: Jun. 14, 2022

(54) PILOT ACTUATOR FOR ACTUATING A CONTROL VALVE

(71) Applicant: Minimax Viking Research & Development GmbH, Bad Oldesloe (DE)

(72) Inventors: Shawn J. Feenstra, Caledonia, MI (US); Marc Serge Ferere, Grand Rapids, MI (US)

(73) Assignee: Minimax Viking Research & Development GmbH, Bad Oldesloe (DE)

( * ) Notice: Subject to any disclaimer, the term of this patent is extended or adjusted under 35 U.S.C. 154(b) by 0 days.

(21) Appl. No.: 16/958,531

(22) PCT Filed: Dec. 19, 2019

(86) PCT No.: PCT/US2019/067666
§ 371 (c)(1),
(2) Date: Jun. 26, 2020

(87) PCT Pub. No.: WO2020/132359
PCT Pub. Date: Jun. 25, 2020

(65) Prior Publication Data
US 2021/0299495 A1  Sep. 30, 2021

Related U.S. Application Data

(60) Provisional application No. 62/783,055, filed on Dec. 20, 2018.

(51) Int. Cl.
*A62C 35/68* (2006.01)
*F16K 7/17* (2006.01)
(Continued)

(52) U.S. Cl.
CPC .............. *A62C 35/68* (2013.01); *E03D 3/06* (2013.01); *F16K 7/17* (2013.01); *F16K 31/12* (2013.01)

(58) Field of Classification Search
None
See application file for complete search history.

(56) References Cited

U.S. PATENT DOCUMENTS

| 4,286,668 A | 9/1981 | McCormick |
| 4,356,868 A | 11/1982 | Bentley et al. |

(Continued)

FOREIGN PATENT DOCUMENTS

| WO | WO 2018/049422 | 3/2018 |
| WO | WO 2020/132355 | 6/2020 |

OTHER PUBLICATIONS

International Searching Authority, International Search Report and Written Opinion in International Appln. No. PCT/US2019/067666, dated Apr. 24, 2020, 16 pages.

(Continued)

*Primary Examiner* — Daphne M Barry
(74) *Attorney, Agent, or Firm* — Perkins Coie LLP

(57) ABSTRACT

A pilot actuator for controlling the operation of a control valve. The control valve can be part of a thy-type fire suppression sprinkler system in which the sprinkler piping network is filled with pressurized gas such as, for example, air, nitrogen, or another gas. The pilot actuator is a differential valve that actuates the control valve when the gas pressure in the sprinkler piping network is at or below a value for tripping or actuating the pilot valve to the open position. The actuator assembly defines a neutral chamber that is at an intermediate pressure in comparison to pressures at the inlet port and the measuring port when the pilot actuator is in a stand-by state.

31 Claims, 4 Drawing Sheets

(51) Int. Cl.
*E03D 3/06* (2006.01)
*F16K 31/12* (2006.01)

(56) References Cited

U.S. PATENT DOCUMENTS

| | | |
|---|---|---|
| 6,068,057 A | 5/2000 | Beukema |
| 6,378,616 B2 | 4/2002 | Reilly |
| 6,666,277 B2 | 12/2003 | Reilly |
| 2007/0289751 A1 | 12/2007 | Feenstra et al. |
| 2014/0182694 A1 | 7/2014 | Cheron et al. |
| 2014/0182865 A1 | 7/2014 | Ringer |
| 2016/0008645 A1 | 1/2016 | Deurloo |
| 2017/0198819 A1 | 7/2017 | Ringer et al. |

OTHER PUBLICATIONS

Tyco Fire Protection Products, Datasheet, Model DP-1 Dry Pilot Actuator for Deluge and Preaction Systems Dry Pilot Release Service, TFP 1380, Dec. 2016, 2 pages.

Victaulic Company, Series 768N FireLock NXT™ Dry Valve, Installation, Maintenance, and Testing Manual, 8918 Rev C, Aug. 2016, 34 pages.

Globe Fire Sprinkler Corporation, Technical Datasheet, Model RCW Dry System Valve, GFV-305 (Formerly H-3), Mar. 2018, 11 pages.

Victaulic Company, 30.65, Series 776 Low Pressure Actuator, 2982 Rev E, 2005, 2 pages.

Reliable Automatic Sprinkler Company, Model A Dry Pilot Line Actuator, Instructions for Installation, Operation, Care and Maintenance, Bulletin 504 Rev. I, Apr. 2001, 2 pp.

The Viking Corporation, 4" Model G-4000, Dry Valve Riser Assembly, Form No. F_091208, Dry 119A, May 28, 2013, 14 pages.

PILOT ACTUATOR FOR ACTUATING A CONTROL VALVE

PRIORITY CLAIM & INCORPORATION BY REFERENCE

This application is a 35 U.S.C. § 371 application of International Application No. PCT/US2019/067666, filed Dec. 19, 2019, which claims the benefit of U.S. Provisional Application No. 62/783,055 filed Dec. 20, 2018, each of which is incorporated by reference in its entirety.

TECHNICAL FIELD

The present disclosure relates to fire suppressant sprinkler systems and more particularly, to a pilot actuator for actuating a control valve of a sprinkler system.

BACKGROUND ART

Automatic fire protection sprinkler systems are used to protect property and life from damage and loss due to fires. The types of systems that are currently used for fire protection can include wet systems and dry systems. In a wet system, the sprinkler piping system is filled with pressurized fluid (e.g., water, a foam solution, or another fire suppressant fluid) to permit a more rapid response. These systems can include sprinklers that have a fusible heat activated link or a glass bulb to seal the outlet of the pressurized sprinkler piping system. When a fire starts, the fusible heat activated link or the glass bulb opens due to the heat of the fire, which allows the flow of liquid until the sprinkler system is manually shut off.

However, in a dry system, the sprinkler piping is not filled with fluid but can either be open to atmosphere or filled with a compressed gas. Dry systems are primarily used to protect unheated structures where the system may be subject to freezing or in areas that are susceptible to water damage. In some dry systems, the sprinklers can be sealed so that the sprinkler piping can be pressurized. The compressed gas can be air or another type of gas such as, for example, nitrogen. When a fire starts, the fire system is actuated based on the gas pressure in the piping network dropping to a predetermined value. For example, the gas pressure can be released due to a sprinkler opening from the fire. A pilot actuator monitors the pressure in the sprinkler piping and, upon the gas pressure in the sprinkler piping dropping to a predetermined value, a dry pipe valve (also referred to herein as a "control valve") can be opened to fill the sprinkler piping with fluid (e.g., water, a water foam solution, or another fire suppressant solution). A benefit of a dry system over a wet system is that the piping network is free from liquid in the non-actuated state and thus the risk of the pipes freezing is eliminated.

In deluge-type dry systems, the sprinkler piping and sprinklers are open to atmosphere and thus the sprinkler piping is not pressurized. However, in some deluge systems, a pilot line that feeds a sealed pilot sprinkler is filled with pressurized gas with the rest of the sprinkler piping open to atmosphere. A pilot actuator monitors the pressure in the pilot line and, similar to the pressurized sprinkler system discussed above, opens a control valve when the pressure in the pilot line drops to a predetermined value.

In some systems, such as a pre-action type system, the fire is detected using a sensor such as, for example, smoke detectors, heat sensor, infrared sensors, or another type of sensor for detecting a fire. Upon detecting a fire, pressure is released from a pilot line or an automatic sprinkler is operated to release pressure from the sprinkler piping. Upon release of the pressure, a pilot actuator opens a control valve as discussed above.

As indicated above, in deluge, pre-action, and dry systems, the fluid is prevented from entering the sprinkler piping by the control valve. In some systems, the control valve can be a diaphragm or piston operated valve that uses pressure in a chamber (also referred to herein as "prime chamber") to control the open and close operation. In a ready or stand-by state, the control valve is held closed by introducing pressurized fluid into the prime chamber of the control valve to press the diaphragm/piston against the control valve seat, which separates the control valve inlet from the control valve outlet. To open the control valve, the fluid in the prime chamber is depressurized by draining the fluid. As the prime chamber depressurizes, the diaphragm/piston separates from the control valve seat to allow the fire suppression fluid to flow into the sprinkler piping.

In some systems, a pilot actuator, which can be a differential valve, is used to control the draining operation of the prime chamber of a control valve. A control valve that is operated by a pilot actuator is shown in Viking Technical Data entitled, "4" MODEL G-4000 DRY VALVE RISER ASSEMBLY" (May 2013) ("G-4000 publication"), which is incorporated herein by reference in its entirety. In such conventional systems, as the inlet fluid pressure to the control valve increases, the pressure in the prime chamber of the control valve must be increased to keep the control valve closed. In a dry-type sprinkler piping network filled with compressed gas, if the pressure in the prime chamber of the control valve increases, the gas pressure in the sprinkler piping network must also be increased to keep the pilot actuator from inadvertently opening and draining the prime chamber. The principle is similar in the deluge-type and pre-action type systems discussed above. For example, in the Model A Dry Pilot Line Actuator offered by Reliable, as the inlet water supply pressure changes from 20 psi to 175 psi, the minimum gas pressure in the pilot line/sprinkler piping must be changed from approximately 10 psi to approximately 40 psi to close the dry pilot actuator. Similarly, in the Model DP-1 Dry Pipe Actuator offered by Tyco Fire Products, LP, as the inlet water supply pressure changes from 20 psi to 250 psi, the minimum gas pressure in the pilot line/sprinkler piping must be changed from approximately 10 psi to approximately 25 psi to close the pilot actuator. In practice, to minimize nuisance (false) trips and ensure the pilot actuator remains closed, the pilot line/sprinkler piping is pressurized to an operating gas pressure that is higher than the minimum gas pressure (e.g., by about 10 to 15 psi). However, a higher operating pressure in the sprinkler piping means that there can be more leaks and/or a greater leakage rate. To maintain the gas pressure in the sprinkler piping at the higher operating pressure, a compressor will need to run more frequently, which can lead to more moisture in the sprinkler piping and/or higher operational and maintenance costs. In addition, if higher operational pressures are needed in the sprinkler piping network due to higher inlet water pressures, more economical sprinkler piping (e.g., PVC piping) and/or some applications (e.g., residential applications) may be prohibited by regulations.

The Series 776 Low Pressure Actuator offered by Victaulic purportedly allows the gas pressure in the sprinkler piping to be maintained at relatively constant low minimum pressure setting for a range of inlet water pressures. However, the Series 776 Low Pressure Actuator has a complex configuration with upper and lower chambers and upper and lower diaphragms.

Further limitations and disadvantages of conventional, traditional, and proposed approaches will become apparent to one skilled in the art, through comparison of such approaches with embodiments of the present invention as set forth in the remainder of the present disclosure with reference to the drawings.

SUMMARY OF THE INVENTION

Preferred embodiments of the invention are directed to a pilot actuator that has an actuator assembly that forms a chamber (also referred to herein as a "neutral chamber"). In some exemplary embodiments, a pilot actuator includes a housing that defines an interior chamber. The pilot actuator can also include an actuator assembly disposed in the interior chamber so as to divide the interior chamber into a first chamber and a second chamber, with the first chamber having a gas pressure monitoring port for fluid communication with, for example, a dry-type sprinkler piping network. The second chamber can preferably have an output port for draining fluid from the second chamber and an inlet port for selective fluid communication between the second chamber and a prime chamber of a control valve. Preferably, the actuator seat is configured to allow fluid flow between the inlet port and the second chamber by moving the actuator assembly away from the actuator seat when the pilot actuator is at or below a trip pressure as measured at the gas pressure monitoring port. The actuator seat can be further configured to fluidly isolate the inlet port from the second chamber by moving the actuator assembly until the actuator assembly is contiguous with the actuator seat when pressure at the gas pressure monitoring port is above the trip pressure. Preferably, the actuator assembly includes a first diaphragm and a second diaphragm that define the neutral chamber. In some embodiments, the actuator assembly includes a piston that is disposed inside the neutral chamber. Preferably, the neutral chamber is at an intermediate pressure in comparison to the pressures at the inlet port and the measuring port when the pilot actuator is in a stand-by state. In some embodiments, a portion of the housing of the pilot actuator corresponding to the actuator assembly includes a vent that provides fluid communication between the neutral chamber and atmosphere. Preferably, the neutral chamber is configured to identify a failure in the actuator assembly such as, for example, a ruptured diaphragm.

In some embodiments, when the actuator assembly is away from the actuator seat, a total fluid flow from the inlet port to the output port passes through the actuator seat and to the output port. In some embodiments, the pilot actuator has a ratio of a change in a trip pressure set point to a change in an inlet pressure (hereinafter "trip setpoint variance ratio") that preferably has a low value such as, for example, less than 0.045. A low value means the trip setpoint of the pilot actuator remains relatively constant as the inlet pressure to the control valve changes. In an ideal scenario, the trip setpoint variance ratio is zero (trip set point value does not change). In some embodiments of the present technology, the trip setpoint variance ratio is preferably in a range from 0.007 to 0.045. Thus, the pilot actuator in embodiments of the present disclosure can have a relatively constant trip pressure set point.

"Trip pressure set point" as used herein means the pressure at which the pilot actuator trips or actuates, as measured at the measurement port of the pilot actuator. Preferably, the trip pressure set point of the pilot actuator does not vary more than 3 psi for pressures between 20 psi to 250 psi at the inlet port of the pilot actuator.

Another embodiment of the present disclosure is directed to a method of operating a control valve using a pilot actuator. The method includes closing the control valve by holding liquid in a prime chamber of the control valve by sealing an actuator seat in the pilot actuator using gas pressure from a sprinkler piping network. The method also includes opening the control valve by draining the liquid from the prime chamber such that, when the gas pressure drops to a trip pressure for the pilot actuator, the pilot actuator seat is unsealed to cause a total fluid flow of the liquid from the prime chamber of the control valve to pass through the actuator seat. Preferably, the trip pressure for the pilot actuator does not vary more than 3 psi for pressures that are between 20 psi to 250 psi at the inlet port of the pilot actuator.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTIONS OF THE DRAWINGS

The accompanying drawings, which are incorporated herein and constitute part of this specification, illustrate exemplary embodiments of the invention, and, together with the description given above, serve to explain the features of the invention.

FIG. 1 a schematic of a preferred sprinkler system;

DETAILED DESCRIPTION

Various embodiments of the present technology generally relate to a pilot actuator for controlling the operation of a control valve. Preferably, the control valve is part of a dry-type fire suppression sprinkler system in which the sprinkler piping network is filled with pressurized gas such as, for example, air, nitrogen, or another gas. However, in other embodiments, the control valve is part of a deluge-type systems and/or a pre-action system. Preferably, the pilot actuator is a differential valve that actuates the control valve when the gas pressure in the sprinkler piping network is at or below a value for tripping or actuating the pilot valve to the open position. In some embodiments, the pilot actuator is configured to have a trip setpoint variance ratio that is preferably in a range of 0.007 to 0.045. In some embodiments, the pilot actuator has a neutral chamber that is at an intermediate pressure in comparison to pressures at the inlet port and the measuring port of the pilot actuator when the pilot actuator is in a stand-by state.

Figure 1:
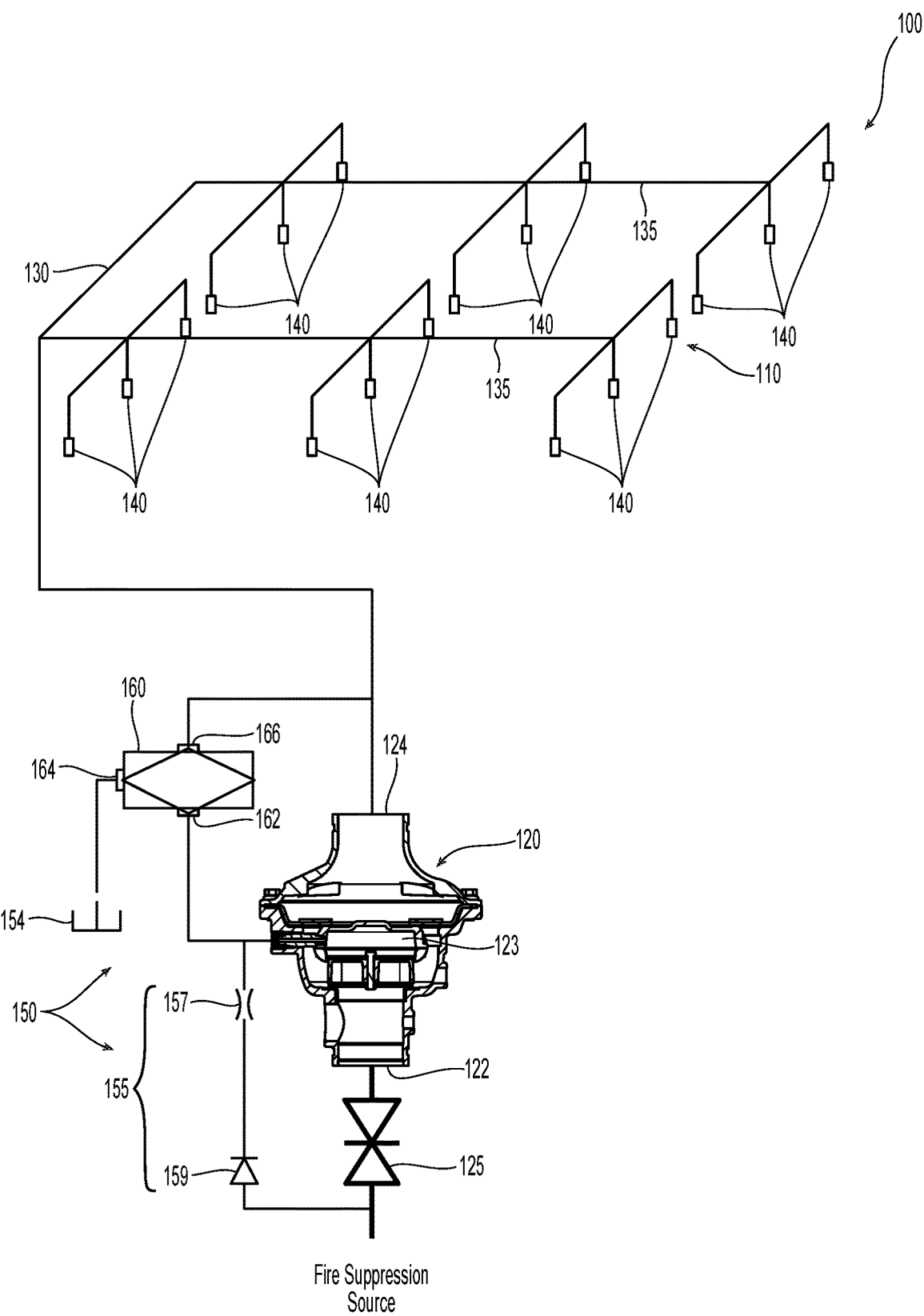

FIG. 1 illustrates a schematic of an exemplary embodiment of a fire suppression system 100. The fire suppression system 100 includes a pipe valve or control valve 120 that is connected to sprinkler piping network 110 which can include one or more headers 130. Each of the headers 130 can have and one or more branch lines 135 with each branch line 135 having one or more sprinklers 140 that can spray fire suppressant fluid such as, for example, water, a foam solution, or some other type of fire suppression solution in an area to be protected. The inlet to the control valve 120 can be coupled to a manual shut-off valve 125. When the fire suppression system 100 is in a ready (or stand-by) state, the control valve 120 is closed to prevent the fire suppression fluid from entering the sprinkler piping network 110. However, the manual shut-off valve 125 is open and in fluid communication with a fire suppression source (not shown), which can be, for example, a storage tank (e.g., a foam and/or water storage tank) and/or a municipal water supply.

The fire suppression system 100 can be a deluge-type system, pre-action system, or dry-type sprinkler system. Accordingly, those skilled in the art will recognize that the pilot actuator of the present technology can also be used in deluge-type systems, pre-action systems, and dry-type sprinkler systems in which the sprinkler lines are filled with a compressed gas. However, for clarity and brevity, embodiments of the present technology are discussed with the fire suppression system 100 being a dry-type sprinkler system respect in which the sprinkler lines are filled with a compressed gas and the pilot actuator is described as a dry-pilot actuator.

When the dry fire suppression system 100 is in the stand-by state, the sprinkler piping network 110 or a portion thereof (e.g., a feed line) can be filled with a pressurized gas, such as for example, compressed air. When a fire starts, the gas pressure in the sprinkler piping network 110 is released, for example, due to a sprinkler head and/or a vent valve (not shown) opening in the sprinkler piping network 110 and/or for some other reason. Upon a drop in the gas pressure in the sprinkler piping network 110 to at or below a trip pressure set point for the dry pilot actuator 160, the dry pilot actuator 160 actuates. The actuation of the dry pilot actuator 160 opens the control valve 120 and the fire suppressant fluid (e.g., water, a foam solution, and/or some other fire suppression solution) is delivered to the piping network 110 so that one or more sprinklers 140 can spray the fire suppressant fluid in the area to be protected.

For clarity, exemplary embodiments of the present technology may be described with air as the compressed gas in the sprinkler piping network and/or water as the fire suppression fluid in some portions of the description. However, those skilled in the art understand that other types of gases can be used (e.g., nitrogen or another gas) and other types of fire suppression fluids can be used (e.g., a foam solution or another fire suppression solution).

Preferably, the control valve 120 includes an inlet 122 that is coupled to the manual shut-off valve 125 and an outlet 124 that is coupled to the sprinkler piping network 110. In some embodiments, the control valve 120 uses an internal diaphragm having a sealed position and an open position to control the flow of fluid from the inlet 122 to the outlet 124 of the control valve 120. In the open position, the control valve 120 permits fluid to flow into the sprinkler piping network 110 and in the closed (or sealed position) the fluid is prevented from flowing to the sprinkler piping network 110. Preferably, the position of the control valve diaphragm between the open position and the closed (or sealed) position is controlled by fluid pressure acting on an external surface of the diaphragm, which is opposite the diaphragm's sealing surface that faces the seat of the control valve 120.

Preferably, the fire suppression fluid is controlled such that the fluid flows in and out of the diaphragm chamber 123 to pressurize or depressurize the diaphragm or prime chamber 123. Thus, to close the control valve 120, fluid pressure is exerted on the external surface of the control valve diaphragm to move the diaphragm against the control valve seat. To open the control valve 120, fluid pressure is released from the external surface of the control valve diaphragm to move the diaphragm away from the control valve seat. In some embodiments, the source of the fluid pressure to operate the control valve 120 is the fire suppression source.

Preferably, during operation, the fire suppression source provides an uninterrupted source of fluid to the prime chamber 123 of the control valve 120. For example, as seen in FIG. 1, a trim assembly 150 for controlling the diaphragm of the control valve 120 includes a fluid supply assembly 155 that is connected to the prime chamber 123 of the control valve 120. The fluid supply assembly 155 is also connected to the fire suppression source at the inlet of the manual shut-off valve 125. By connecting to the inlet of the manual shut-off valve 125, the fire suppression system 100 allows the control valve 120 to close prior to opening the manual shut-off valve 125. Preferably, the fluid supply assembly 155 includes a restrictive member 157 for restricting the volumetric flow rate of the fluid entering the prime chamber 123. The restrictive member 157 can be, for example, an orifice plate, a section of narrow piping, or some other restriction that limits the volumetric flow of the fluid to the prime chamber 123. The prime supply assembly 155 also includes a check valve 159 to prevent back flow in case the pressure from the fire suppression source drops for any reason. By preventing the back flow, the check valve 159 keeps the prime chamber 123 pressured to prevent an inadvertent opening of the control valve 120. In operation, fluid from the fire suppression source, for example, water from a municipal water system and/or a water storage tank (or some other fire suppression fluid from some other source), is fed to the inlet of the manual shutoff valve 125. Preferably, the fluid supply assembly 155 is tapped off the inlet of the manual shutoff valve 125 using a known means. The fluid from the source is fed through the restrictive member 157 to supply and pressurize the prime chamber 123 of the control valve 120, as discussed above.

The trim assembly 150 also includes the dry pilot actuator 160, which is, for example, a differential valve. Preferably, the dry pilot actuator 160 includes an inlet port 162 that is connected to the prime chamber 123 of the control valve 120 and an outlet port 164 that is connected to a system drain 154. Preferably, the inlet port 162 and/or the outlet port 164 are threaded to facilitate coupling to piping. Of course, other types of connections means can be used. The system drain 154 is preferably at atmospheric pressure. When in its actuated state, the dry pilot actuator 160 provides a fluid path for discharging the fluid from the prime chamber 123 (thus opening the control valve 120) to the system drain 154 through the dry pilot actuator 160. Preferably, the fluid path for draining the prime chamber 123 includes the inlet port 162 of the dry pilot actuator 160 for receiving the fluid from the prime chamber 123 and the outlet port 164 of the dry pilot actuator 160 for discharging the fluid to the system drain 154. When the dry pilot actuator 160 is in a stand-by state, the dry pilot actuator 160 is closed and thus the fluid path is blocked. Preferably, when the dry pilot actuator 160 is in the closed position, the dry pilot actuator 160 keeps the fluid in the prime chamber 123 pressurized to keep the control valve 120 closed. Accordingly, actuation of the dry pilot actuator 160 allows the fluid in the prime chamber 123 to drain, which opens the control valve 120, and closing the dry pilot actuator 160 prevents the fluid in prime chamber 123 from draining, which keeps the control valve 120 closed.

In the exemplary embodiment of FIG. 1, the fluid pressure in the prime chamber 123 will be the same as the inlet pressure to the control valve 120. The pressurized fluid in the prime chamber 123 moves (or maintains) the control valve diaphragm against the control valve seat to close the control valve 120. When the dry pilot actuator 160 is in the open position, the fluid in the prime chamber is drained through the outlet port 164 of the dry pilot actuator 160 to, for example, the system drain 154. Preferably, the draining of the fluid via the outlet port 164 of the dry pilot actuator 160 is done faster than the flow of the fluid supplying the prime chamber 123. To this end, the restrictive member 157 ensures that, in the event the dry pilot actuator 160 opens, the volumetric flow rate of the fluid entering the prime chamber 123 is less than the volumetric flow rate of the fluid exiting the prime chamber 123 via outlet port 164 of the dry pilot actuator 160. By draining the fluid in the prime chamber 123, the prime chamber 123 is depressurized and the control valve 120 is opened.

In some embodiments of the present disclosure, for example, as seen in FIG. 1, the dry pilot actuator 160 includes a third port 166 (also referred to herein as "measurement port 166") that can be fluidly connected to a line (or other component) that changes pressure to indicate that there is a fire. For example, in some embodiments, the measurement port 166 can be connected to the sprinkler piping network 110 to monitor the pressure in the sprinkler piping network 110, which can be filled with a compressed gas at a predetermined pressure value. In other embodiments, the measurement port 166 can be coupled to the feed line of a pilot sprinkler in a deluge sprinkler system (not shown) and/or part of a pre-action system. Preferably, the measurement port 166 is threaded to facilitate coupling to piping. Of course, other types of connections means can be used. Preferably, the feed line of the pilot sprinkler is filled with compressed gas at a predetermined pressure value, while the remaining sprinklers in the deluge system are open to atmosphere. For clarity, exemplary embodiments will be described with the dry pilot actuator 160 connected to sprinkler piping network 110, but those skilled in the art will understand that the dry pilot actuator 160 can be configured to be used in other types of sprinkler systems such as, for example, a deluge system.

When there is sufficient gas pressure in the sprinkler piping network 110, the gas pressure is fluidly transmitted to the dry pilot actuator 160 via the monitoring port 166 to keep the dry pilot actuator 160 closed. The dry pilot actuator 160 is preferably biased such that, when the gas pressure in the sprinkler piping network 110 drops to a trip pressure set point of the dry pilot actuator 160, the dry pilot actuator 160 opens to allow the fluid from the prime chamber 123 to drain and thus open the control valve 120. The source of gas to pressurize the sprinkler piping network 110 can come from a gas compressor (not shown) attached locally or disposed in a remote location. In some embodiments, the gas compressor can be connected to a pressurized storage tank that is connected to the sprinkler piping network 110.

In operation, the dry pilot actuator 160 controls fluid pressure in the prime chamber 123 so as to either close the control valve 120 to isolate the sprinkler piping network 110 from the fire suppression source or open the control valve 120 to allow fluid from the fire suppression source to enter into the sprinkler piping network 110 and out one or more sprinklers 140 to cover the area to be protected. Preferably, the dry pilot actuator 160 is a differential fluid control valve that is configured to have a differential ratio of the inlet fluid pressure to the gas pressure that is in a range of approximately 4 to 36. Preferably, the dry pilot actuator 160 is configured to actuate when the gas pressure drops to or below a trip pressure set point that is in a range of 5 psi to 8 psi, and more preferably in a range of 5 psi to 7 psi. Preferably, a trip setpoint variance ratio of the dry pilot actuator 160 is 0.045 or less, more preferably, 0.022 or less, and even more preferably, 0.013 or less. In some embodiments, the trip setpoint variance ratio is preferably in a range of 0.007 to 0.045, and more preferably, in a range of 0.010 to 0.022. For example, if the trip pressure set point changes 10 psi (e.g., from 5 psi to 15 psi) as the inlet pressure changes from 20 psi to 250 psi, the trip setpoint variance ratio will be 0.043 (10/230) and thus a relatively low trip setpoint variance ratio. In contrast, some prior art pilot actuators have a trip setpoint variance ratio that is relatively large. For example, the Tyco Model DP-1 Dry Pipe Actuator discussed above has a trip setpoint variance ratio of 0.065 ((25 psi−10 psi)/(250 psi−20 psi)) and the Reliable Model A Dry Pilot Line Actuator has a trip setpoint variance ratio of 0.19 ((40−10)/(175−20)). While the Victaulic Series 776 Low Pressure Actuator purports to have a relatively constant trip set point, the Victaulic actuator has a complex flow path in which the flow through the actuator is split into two portions. Embodiments of the present technology provide for a less complex flow path in which a total fluid flow from the inlet port to the output port passes through the actuator seat and to the output port.

In exemplary embodiments, a trip pressure set point for the dry pilot actuator 160 preferably does not vary more than 10.0 psi, more preferably, does not vary more than 5.0 psi, even more preferably, does not vary more than 3 psi, and even still more preferably, does not vary more than 2 psi for pressures at the inlet port 162 that are in a range of 20 psi to 250 psi. In contrast, for some conventional actuators, the gas pressures at which the actuator trips can vary greatly based on the inlet fluid pressure. For example, as the inlet fluid pressure increases from 20 psi to 250 psi, the minimum gas pressure to keep some conventional actuators closed can change from approximately 10 psi to approximately 25 psi. Thus, the operational gas pressure in conventional piping systems needs to increase as the inlet fire suppression fluid pressure increases. To prevent false (nuisance trips), the operational pressure is typically set higher than the expected trip pressure set point for the actuator. In the case of conventional systems, the operational gas pressure setting can be approximately 25 psi to approximately 40 psi. However, the high operational pressures in conventional systems means high gas leakage rates and more frequent gas compressor operation, which can result in high operation and maintenance costs.

In exemplary embodiments of the present disclosure, because the dry pilot actuator 160 has a relatively constant trip pressure set point or a relatively small change in the trip pressure set point, the same operational pressure for the sprinkler piping network can be used for inlet liquid pressures ranging from 20 psi to 250 psi. Preferably, the operating gas pressure in the sprinkler piping network 110 is kept high enough above the trip pressure set point to prevent false (nuisance) trips of the fire suppression system. However, the operational gas pressure setting in exemplary embodiments of the present disclosure will still be less than those of some conventional systems. For example, in some embodiments, the operating gas pressure in the sprinkler piping network 110 can be in a range of 9 psi to 20 psi and, more preferably, in a range of 10 psi to 15 psi. Depending on the application, however, some fire protection systems can have operating pressures lower than 9 psi. The lower operational gas pressures, as compared to corresponding conventional systems, permit exemplary embodiments of the dry pilot actuator 160 to be used with piping and pipe fitting that are rated for lower pressures such as, for example, plastic PVC piping and/or fittings that can be used in residential fire protection systems. However, depending on the application, some fire protection systems can have operating pressures higher than 20 psi.

Figures 2A, 2B:
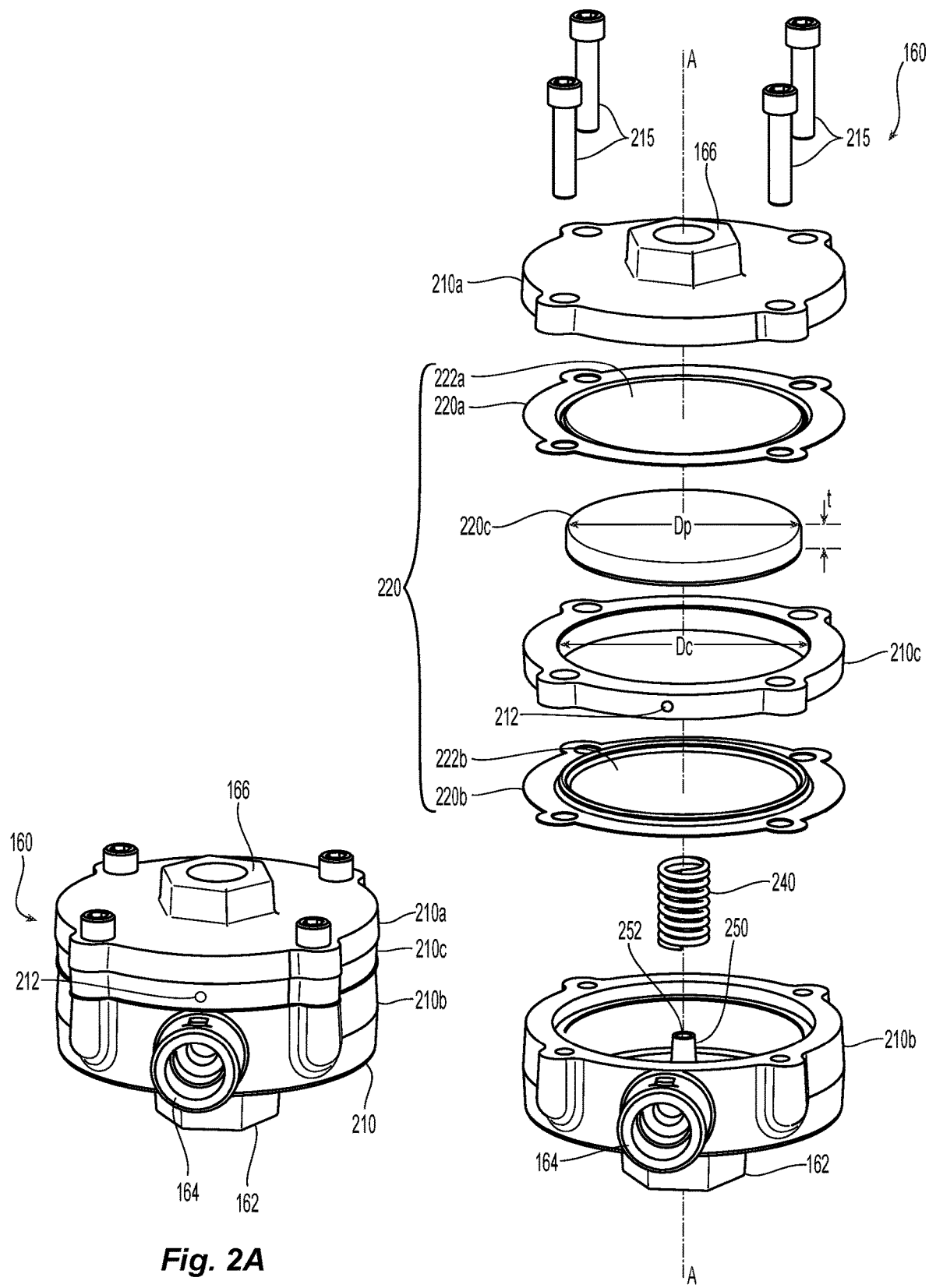
FIG. 2A is a perspective view of a preferred pilot actuator for use in the system of FIG. 1.
FIG. 2B is an exploded perspective view of the actuator of FIG. 2A.

FIGS. 2A and 2B illustrate an exemplary embodiment of a dry pilot actuator 160. The dry pilot actuator 160 has a housing 210 with a cover 210a and a base 210b. In some exemplary embodiments the housing 210 can have a spacer 210c arranged between the cover 210a and the base 210b. As seen in FIG. 2B, the spacer 210c preferably has a cylindrical opening that is centered along the central axis A-A of the dry pilot actuator 160. A diameter $D_C$ of the cylindrical opening of the spacer 210C is preferably in a range of 3.2 in to 3.6 in, and more preferably, in a range of 3.3 in to 3.5 in. In some embodiments, the spacer 210c includes a vent 212 that can provide indication of a ruptured diaphragm as discussed below. Preferably, the vent 212 has a diameter in a range of 0.1 in to 0.2 in, and more preferably 0.15 in. The cover 210a, the spacer 210c, and the base 210b can be bolted together by one or more bolts 215 arranged around the housing 210. Of course, instead of bolts, other type of fastening methods can be used such as, for example, screws, clamps, welding, and the like. In some embodiments, the housing 210 is substantially cylindrical in shape. However, in other embodiments, the assembled housing 210 can have other shapes such as, for example, a substantially rectangular box shape, including a substantially cube shape, or some other appropriate three-dimensional polygonal shape.

The dry pilot actuator 160 can include an actuator assembly 220 for opening and closing the dry pilot actuator 160. Preferably, the actuator assembly 220 includes a dry-side diaphragm 220a that is disposed between the cover 210a and the spacer 210c. In some embodiments, the actuator assembly 220 also includes a wet-side diaphragm 220b that can be disposed between the spacer 210c and the base 210b. Preferably, the diaphragms 220a, 220b are flexible and at least center portions 222a, 222b of the respective diaphragms 220a, 220b move when pressure is applied and/or released to an outer surface of the respective diaphragms. Preferably, the diaphragms 220a and 220b are made of a resilient material such as, for example, ethylene propylene diene monomer (EPDM) rubber or some other resilient material. In some embodiments, both diaphragms 220a, 220b are made of the same material. In other embodiments, the diaphragms 220a, 220b are made of different materials.

In exemplary embodiments of the disclosure, the dry-side diaphragm 220a is configured such that at least the center portion 222a can move, at least partially, into the cylindrical opening of the spacer 210c. In some embodiments, the wet-side diaphragm 220b is configured such that at least the center portion 222b can move, at least partially, into the cylindrical opening of the spacer 210c. Preferably, a diameter of the center portion 222a, 222b of each diagram, 220a, 220b, respectively, is in a range of 3.2 in to 3.4 in. In other embodiments, the wet-side diaphragm 220b is configured such that at least the center portion 222b does not enter the cylindrical opening of the spacer 210c.

In some exemplary embodiments, the actuator assembly 220a includes a piston 220c that is disposed between the diaphragms 220a and 220b. Preferably, the piston 220c is disc shaped with a diameter Dp that is in a range of 3.2 in to 3.4 inches. In some embodiments, the piston 220c has a thickness t that is in a range of 0.35 in to 0.4 in. However, the piston 220c may have alternate geometries such as a square, rectangular or another polygonal shape. In some embodiments, the piston 220c is rigid such that the piston 220c does not flex or deform during operation of the dry pilot actuator 160. For example, the piston 220c can be made of a material such as, for example, 10% glass filled polycarbonate or some other appropriate material. Preferably, when the dry pilot actuator 160 is assembled, the piston 220c is disposed in the center portions 222a, 222b of the respective diaphragms. In some embodiments, one or both diaphragms 222a, 222b are integral to the piston 220c so as to form a single unit.

In the embodiment illustrated in FIG. 2B, the combination of the actuator assembly 220 includes diaphragms 220a, 220b and the piston 220c, which move in unison to open or close the dry pilot actuator 160. However, in some embodiments, the actuator assembly 220 does not need all three components. For example, in some embodiments, a single diaphragm can be used, and in other embodiments, a single diaphragm can be operatively coupled to the piston 220c to form the actuator assembly. In some embodiments, the single diagram and the piston can form a single unit. In other embodiments, the piston is not used, and one or more diaphragms can be configured to perform the function of the actuator assembly.

In some exemplary embodiments, the dry pilot actuator 160 also includes a biasing member that provides a bias to open the dry pilot actuator 160. Preferably, the dry pilot actuator 160 is biased in the open state when the ports are not pressurized (e.g., an "on-the-shelf" state). Accordingly, the dry pilot actuator 160 can provide a simpler installation by eliminating the need for additional latching to maintain the actuator open. For example, as seen in FIG. 2B, the dry pilot actuator 160 can include a spring 240 that provides a biasing force against the wet-side diaphragm 220b and thus moves the actuator assembly 220 (e.g., diaphragms 220a, 220b and piston 220c) away from sealing surface 252 of actuator seat 250 of the dry pilot actuator 160. Preferably, the length of spring 240 is in a range of 1.5 in to 2.0 in. In some embodiments, the spring 240 can preferably have a spring constant in a range of 54 lbs/in to 66 lbs, and more preferably in a range of 57 lbs/in to 63 lbs/in. The spring 240 preferably circumscribes the actuator seat 250 when the dry pilot actuator 160 is assembled. Preferably, the mean diameter of the spring 240 is in a range of 0.550 in to 0.700 in, and more preferably in a range of 0.60 to 0.650 in. The embodiment in FIG. 2B illustrates a spring circumscribing the actuator seat 250 to push on the actuator assembly (e.g., diaphragms 220a, 220b and piston 220c). Preferably, the spring 240 and/or the actuator seat 250 are centered along the central axis A-A of the dry pilot actuator 160. In some embodiments, when the dry pilot actuator 160 is closed, the spring 240 produces a force that is in a range of 41.0 lbs to 51.0 lbs, and more preferably 45.0 lbs to 50.0 lbs.

However, other biasing configurations and biasing members can be used. For example, biasing members can be arranged to pull an actuator assembly to the open direction. The biasing member can be made of a material such as, for example, EPDM rubber or some other resilient material. In some embodiments, more than one biasing member can be used. In addition, biasing members other than coil springs can be used such as, for example, wave washers. In some embodiments, a separate biasing member is not used and one or more components in the actuator assembly (e.g., diaphragm 220a and/or diaphragm 220b) provides a resilient force to move the actuator assembly 220 (e.g., diaphragms 220a, 220b and piston 220c) away from the actuator seat 250. In some embodiments, the dry pilot actuator 160 can be configured and/or orientated such that the gravitational force moves and/or assists in moving the actuator assembly 220 (e.g., diaphragms 220a, 220b and piston 220c) away from the actuator seat 250.

Figure 3A:
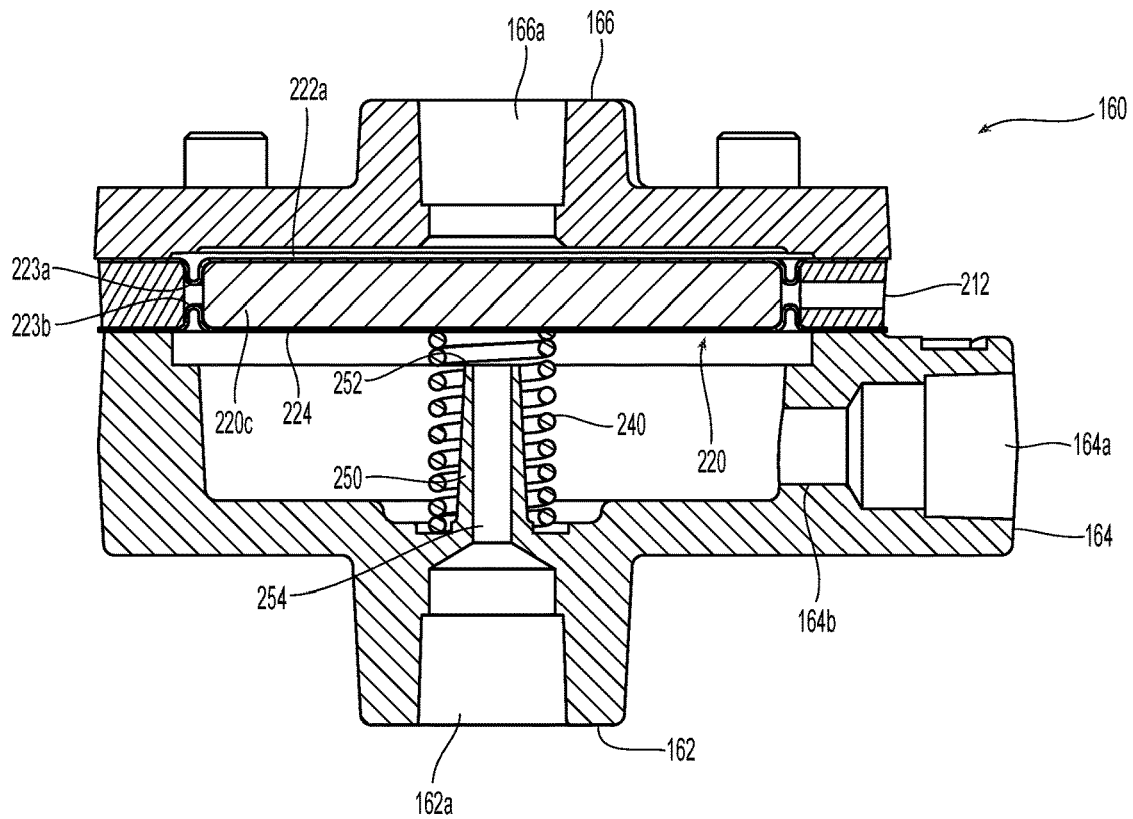
FIG. 3A is a cross-sectional view of the actuator of FIG. 2A in an open state.
Figure 3B:
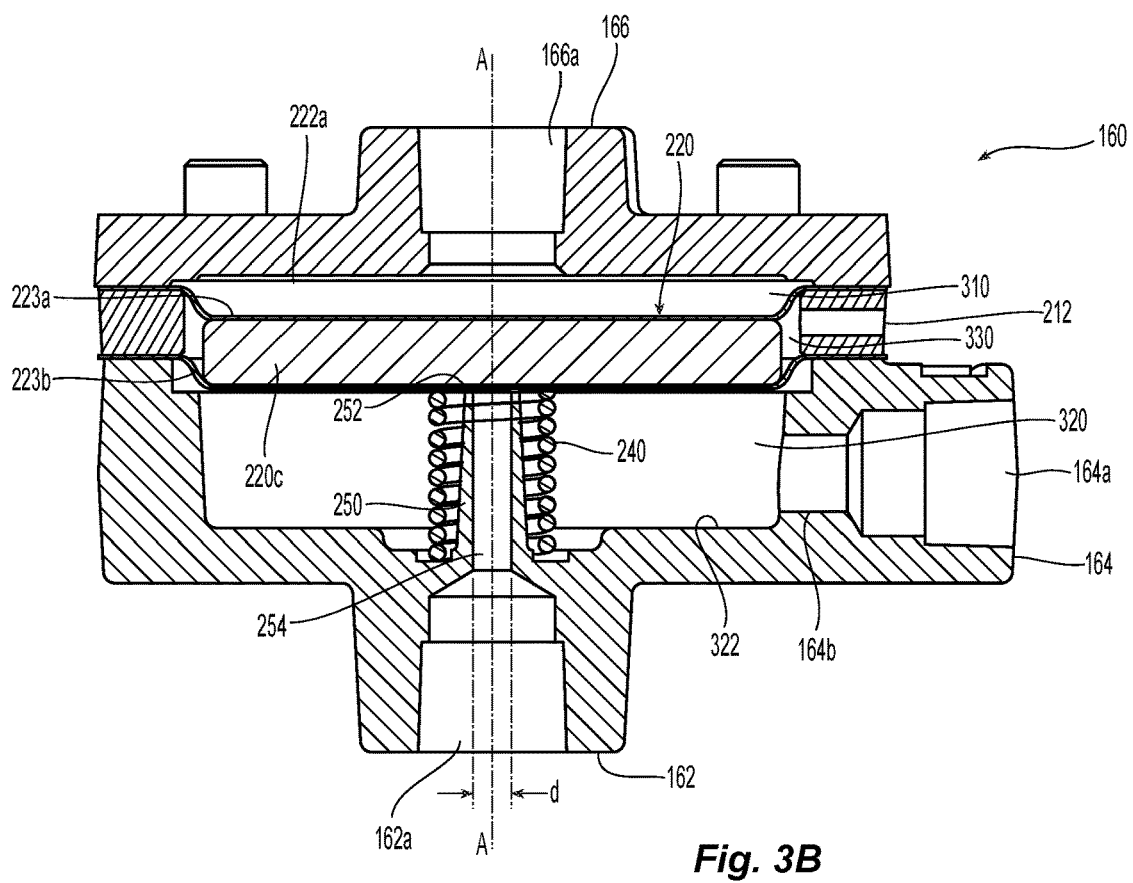
FIG. 3B is a cross-sectional view of the actuator of FIG. 2 in a closed state.

FIGS. 3A and 3B illustrate cross-sectional views of the dry pilot actuator 160 in the open and closed positions, respectively. When assembled, the actuator assembly 220 (e.g., diaphragms 220a, 220b and piston 220c) preferably divides the dry pilot actuator 160 into a dry-side chamber 310 and a wet-side chamber 320. For example, in the illustrated embodiment of FIGS. 3A and 3B, the inside surface of the cover 210a and the surface of the diaphragm 220a can define the dry-side chamber 310, and the inside surface of the base 210b and the wet-side diaphragm 220b define the wet-side chamber 320. Preferably, the measurement port 166 is in fluid communication with the dry-side chamber 310 and the output port 164 is in fluid communication with the wet-side chamber 320. In some embodiments, the inlet port 162 is selectively in fluid communication with the wet-side chamber 320.

In some embodiments, the actuator assembly 220 is attached to the housing 210. For example, as shown in FIGS. 3A and 3B, the outer edge of diaphragm 220a is disposed between the lands of cover 210a and spacer 210c to attach the diaphragm 220a to the housing 210 when assembled. Similarly, the outer edge of diaphragm 220b is disposed between the land of base 210b and the other land of spacer 210c to attach the diaphragm 220b to the housing 210 when assembled. Preferably, the piston 220c is disposed between the diaphragms 220a and 220b such that the piston 220c moves with the diaphragms 220a and 220b during operation of the dry pilot actuator 160. In some exemplary embodiments, the piston 220c is positioned at the center of each diaphragm 220a and 220b when assembled. In some exemplary embodiments, to help position the piston 220c, one or both of the diaphragms 220a and 220b has a lip portion 223a and 223b, respectively, to receive the piston 220c, when assembled. In some embodiments, the lip portion has a height that is in a range of 0.10 in to 0.20 in and a thickness that is in a range of 0.075 in to 0.125 in. Preferably, the lip portion 223a and 223b circumscribe the center portions 222a and 222b, respectively. Preferably, one or both lip portions 223a, 223b can expand to aid in the movement of the respective diaphragm 220a, 220b. For example, in some embodiments, one or both of the lip portions 223a, 223b can be in the form of one or more folds having a circular pattern that expand that the respective diaphragm 220a, 220b moves (see expansion of lip portions 223a, 223b in FIG. 3B when compared to non-expanded form in FIG. 3A). In some embodiments, the lip portions 222a and/or 222b are configured to hold, at least in part, the piston 220c.

In some embodiments, the actuator assembly 220 can form a chamber. For example, in the illustrated embodiment of FIGS. 3A and 3B, the gap between the two diaphragms 220a and 220b due to the spacer 210c can form a neutral chamber 330. Of course, the neutral chamber can be defined using one of the diaphragms 220a, 220b and another component that separates the interior chamber. Preferably, the neutral chamber 330 is at an intermediate pressure in comparison to the pressures at the inlet port 162 and the measurement port 166 when the dry pilot actuator 160 is the stand-by state. Preferably, the intermediate pressure in the neutral chamber 330 aids in the operation of the actuator assembly 220 to open and close the dry pilot actuator 160. In some embodiments, the intermediate pressure in the neutral chamber 330 aids the operation of the actuator assembly 220 such that a trip setpoint variance ratio of the dry pilot actuator 160 is in a range of 0.007 to 0.045, and more preferably, in a range of 0.010 to 0.022. Preferably, the intermediate pressure is atmospheric pressure. In some embodiments, the chamber 330 is open to atmosphere via vent 212 in the spacer 210c.

In some embodiments, the neutral chamber 330 and corresponding vent 212 can provide an indication of whether one or both diaphragms 220a and 220b have failed (e.g., ruptured). For example, if pressurized gas in dry-side chamber 310 leaks from vent 212, it can mean that dry-side diaphragm 220a has failed. If fire suppression fluid (e.g., water) from wet-side chamber 320 starts leaking from the vent 212 (e.g., when the dry pilot actuator 160 is open and wet-side chamber 320 is filled with fluid), it can mean that wet-side actuator 220b has failed. In some embodiments, to determine if there is a failure of the dry pilot actuator 160, instrumentation can be attached to vent 212 and/or the chamber 330 to measure whether there is gas/fluid flow through vent 212 and/or if chamber 330 is pressurized.

Preferably, movement of the actuator assembly 220 relative to the actuator seat 250 opens and closes the dry pilot actuator 160. For example, in the illustrated embodiment of FIGS. 3A and 3B, an actuator seat 250 is preferably formed along an interior surface 322 of the base 210b. The actuator seat 250 preferably includes a sealing surface 252 that faces the seat surface 224 of the wet-side diaphragm 222b and a channel 254 that is fluidly connected to the channel 162a of inlet port 162. Preferably, the actuator seat 250 extends from the interior surface 322 and into the wet chamber 320. Preferably, the actuator seat 250 has a circular geometry, but can have alternate geometries such as a square, rectangular or other polygonal shape. The outer wall of actuator seat 250 can be tapered, as shown in FIGS. 3A and 3B. In some embodiments, the outer wall of actuator seat 250 is straight. Preferably, the channel 162a is centered along the central axis A-A of the dry pilot actuator 160. In some embodiments, the cross-sectional areas of channels 254 and 162a are larger than the cross-sectional area of restrictive member 157 so that the inlet port 162 and the actuator seat 250 can accommodate a larger volumetric flow rate than the restrictive member 157.

In some embodiments, the sealing surface 252 has a planar contact area configured to contact the wet-side diaphragm 220b. Preferably, the sealing surface 252 makes direct contact with the wet-side diaphragm 220b such that the wet-side diaphragm 220b is contiguous with the sealing surface 252 of the actuator seat 250. In some conventional dry pilot actuators, a separate seal member (or members) is used to ensure that the flow from the inlet port is completely sealed when the diaphragm (or piston) is against the actuator seat. However, in some embodiments of the present disclosure, the direct contact of the sealing surface 252 against the wet-side diaphragm 220b is such that a separate seal member is not needed.

Preferably, a diameter d of the channel 254 at the sealing surface 252 is in a range of 0.21 in to 0.23 in. Preferably, the diameter $D_C$ of the cylindrical opening of the spacer 210c (see FIG. 2B) corresponds to an effective pressure area exerted by the gas pressure from the gas monitoring port 166 onto the dry-side diaphragm 220a of the actuator assembly

220. A ratio of the effective pressure area to the cross-sectional area of channel 254 is preferably in a range of 225 to 275 and, more preferably, in a range of 238 to 248. Preferably, the outlet port 164 has a restrictive channel portion 164b to provide some back pressure in the wet-side chamber 320. The back pressure prevents the actuator assembly 220 (e.g., diaphragms 220a, 220b and piston 220c) from chattering against actuator seat 250 when the dry pilot actuator 160 is starting to open. Preferably, the cross-sectional area of restrictive channel portion 164b is larger than the cross-sectional area of restrictive member 157 so that the outlet port 162 can accommodate a larger volumetric flow rate than the restrictive member 157.

Prior to placing the fire suppression system 100 in service, there is no pressure at either the inlet port 162 or the measurement port 166 of the dry pilot actuator 160. Thus, the force from the biasing member, e.g., spring 240, moves the actuator assembly 220 (e.g., diaphragms 220a and 220b and the connected piston 220c) away from the actuator seat 250, which places the dry pilot actuator 160 in the open position, as seen in FIG. 3A. Preferably, as seen in FIG. 3A, in the open position, a gap exists between at least a portion of the dry-side diagram 220a and the inner surface of the cover 210a such that the dry-side chamber 310 is in fluid communication with the measurement port 166 and thus the sprinkler piping network 110.

To place the fire suppression system 100 in service, the fire suppression source is isolated from the fire suppression system 100 and the manual shutoff valve 125 is closed to isolate the control valve 120 from the sprinkler piping network 110. The sprinkler piping network 110 can then be pressurized to an operational pressure that is in a range of 10 psi to 15 psi. With the fire suppression source isolated from the fire suppression system 100, the pressure at the inlet port 162 is at atmospheric pressure or 0 psi. When the sprinkler piping network 110 is pressurized, the gas pressure, which can be in a range of 10 psi to 15 psi, is transmitted to the dry-side of the actuator assembly of the dry pilot actuator 160 (e.g., dry-side diaphragm 220a). Preferably, the operating gas pressure in the sprinkler piping network 110 is enough to overcome the force due to the spring 240 and move the actuator assembly 220 (e.g., diaphragms 220a and 220b and the piston 220c) to the actuator seat 250 such that the dry pilot actuator 160 is in the closed position, as seen in FIG. 3B. In the closed position, the wet-side of the actuator assembly (e.g., wet-side diaphragm 220b) contacts and is contiguous with the sealing surface 252 to seal the actuator seat 250 to fluidly isolate the channel 162a from the wet-side chamber 320. With the gas pressure on the dry-side of the actuator assembly (e.g., dry-side diaphragm 220a) keeping the dry pilot actuator 160 closed, fluid pressure can be introduced to the inlet port 162. For example, with the manual shut-off valve 125 closed, fire suppression fluid (e.g., water) from the fire suppression source can be introduced to the fire suppression system 100. As seen in FIG. 1, when the fire suppression fluid is introduced, a portion of the fluid is diverted to the prime chamber 123 and to the inlet port 162 of the dry pilot actuator 160 via the check valve 159 and restrictive member 157. Because the dry pilot actuator 160 is closed, the fire suppression fluid is prevented from draining and the prime chamber 123 is pressurized to close the control valve 120. In some embodiments, the prime chamber 123 and thus the inlet port 162 can be at a pressure that is in a range of 20 psi to 250 psi. Once the control valve 120 is closed, the fire suppression system 100 enters a stand-by state. So long as the gas pressure at the measurement port 166 does not drop to the trip pressure set point of the dry pilot actuator 160, the dry pilot actuator 160 will remain in the closed position and the fire suppression system 100 will remain in the stand-by state.

Once in the stand-by state, if the pressure in the sprinkler piping network 100 drops to a pressure that corresponds to the trip pressure set point (e.g., a pressure preferably in a range of 5 psi to 8 psi, and more preferably in a range of 5 psi to 7 psi), the dry pilot actuator 160 actuates and moves to the open position. For example, if the gas pressure at the measurement port 166 drops, because of, for example, a fire opening one or more sprinklers 140, the pressure on the dry-side of the actuator assembly 220 (e.g., dry-side diaphragm 220a) is no longer enough to overcome the force of spring 240 and the force due to the fluid pressure in channel 162a. When this occurs, the actuator assembly 220 (e.g., diaphragms 220a and 220b and piston 220c) will move to the open position. With the dry pilot actuator 160 in the open position, a fluid path opens between the inlet port 162 and the outlet port 164, which can be connected to the system drain 154. Because the prime chamber 123 is connected to the inlet port 162 as seen in FIG. 1, the fluid in the prime chamber 123 will start to drain when the dry pilot actuator 160 opens. As discussed above, the volumetric flow rate of the fluid flowing to system drain 154 is preferably greater than the fluid flowing through restrictive member 157. As the fluid in the prime chamber 123 starts to drain, the pressure in the prime chamber 123 starts to drop and the control valve diaphragm will move in the open direction. As the control valve starts to open, the fluid from the fire suppression source enters the sprinkler piping network 110 and sprays out the open sprinklers 140 to cover the affected area. After the fire is extinguished and the fire suppression system 100 is made available for service, the sprinkler piping network 110 is pressurized to its operational pressure setting and placed in a stand-by state as discussed above.

As discussed above, exemplary embodiments of the dry pilot actuator 160 maintain a constant trip pressure set point for a wide fluid pressure range such as, for example, a range of 20 psi to 250 psi. Accordingly, the gas pressure in the sprinkler piping network can be kept at a low operating pressure regardless of the pressure of the fluid in the fire suppression system. That is, the same dry pilot actuator and the same operational gas pressure setting can be used in fire suppression systems having different fluid pressures (e.g., fluid pressures ranging from 20 psi to 250 psi). Thus, unlike some conventional actuators, neither the trip pressure of the actuator nor the gas pressure must be changed if the fluid pressure changes.

Figure 4:
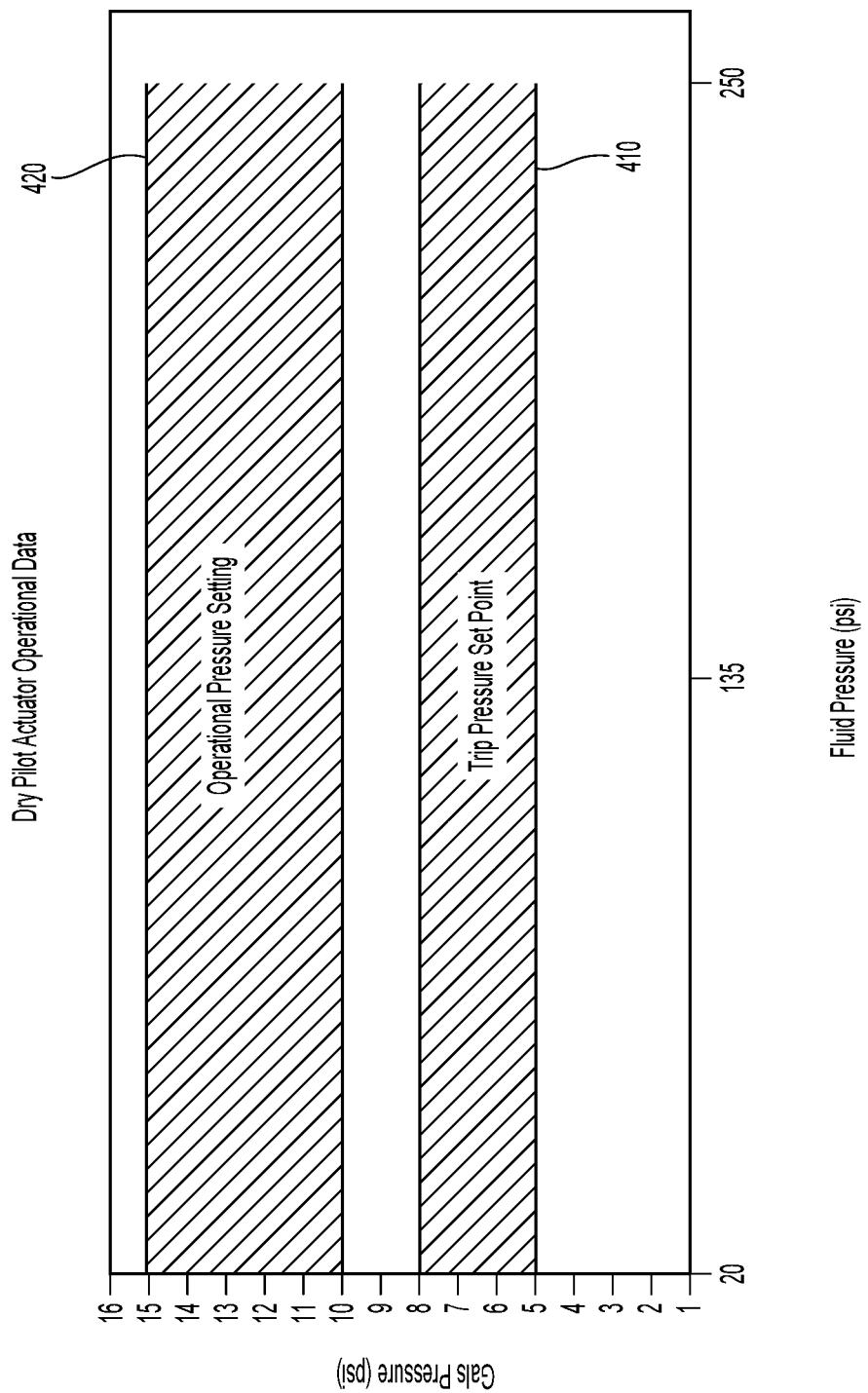
FIG. 4 is a theoretical performance plot of the actuator of FIG. 2A.

FIG. 4 illustrates a plot 410 of an exemplary trip pressure set point bandwidth for a dry pilot actuator of the present disclosure and a plot 420 of an exemplary operational pressure setting for the gas pressure in the sprinkler piping network. For example, for a fire suppression system that has a fluid pressure of 20 psi, the gas pressure in the sprinkler piping network can be set between 10 psi to 15 psi. If the gas pressure in the sprinkler piping network drops to a value that is, for example, between 5 psi and 8 psi (e.g., due to a fire), the dry pilot actuator will open and allow the control valve to open, as discussed above. For a fire suppression system that has a fluid pressure of 250 psi, the gas pressure in the sprinkler piping network does not have to be increased and can still be set between 10 psi to 15 psi. Similar to the 20-psi system, the trip pressure set point for the dry pilot actuator will still be, for example, between 5 psi and 8 psi.

While the present invention has been disclosed with reference to certain embodiments, numerous modifications, alterations, and changes to the described embodiments are possible without departing from the sphere and scope of the present invention. Accordingly, it is intended that the present invention not be limited to the described embodiments, but that it has the full scope defined by the language of the following claims, and equivalents thereof.

What is claimed is:

1. A pilot actuator, comprising:
a housing defining an interior chamber;
an actuator assembly disposed in the interior chamber and dividing the interior chamber into a first chamber and a second chamber;
a gas measurement port for fluid communication between the first chamber and a sprinkler piping network;
an output port for draining fluid from the second chamber;
an inlet port for selective communication between the second chamber and a prime chamber of a control valve; and
an actuator seat disposed along an interior surface of the second chamber, the actuator seat having a channel in fluid communication with the inlet port, the actuator seat configured to fluidly isolate the inlet port from the second chamber when the actuator assembly contacts and is contiguous with the actuator seat, and the actuator seat further configured to permit fluid flow between the inlet port and the second chamber when the actuator assembly is disposed away from the actuator seat,
wherein the actuator assembly defines a neutral chamber that is at an intermediate pressure in comparison to pressures at the inlet port and the gas measurement port when the pilot actuator is in a stand-by state.

2. The pilot actuator of claim 1, wherein a portion of the housing includes a vent that provides fluid communication between the neutral chamber and atmosphere, and
wherein the intermediate pressure is atmospheric pressure.

3. The pilot actuator of claim 2, wherein the vent is formed in the portion of the housing corresponding to the actuator assembly.

4. The pilot actuator of claim 1, wherein the neutral chamber aids in the operation of the actuator assembly to one of fluidly isolate the inlet port from the second chamber or permit fluid flow between the inlet port and the second chamber.

5. The pilot actuator of claim 1, wherein the intermediate pressure in the neutral chamber aids in an operation of the actuator assembly such that a ratio of a change in a trip pressure set point to a change in an inlet pressure at the inlet port is in a range of 0.007 to 0.045.

6. The pilot actuator of claim 1, wherein the actuator assembly includes at least one diaphragm disposed in the interior chamber for defining at least a portion of the neutral chamber.

7. The pilot actuator of claim 6, wherein the neutral chamber is configured to identify a failure in the pilot actuator.

8. The pilot actuator of claim 7, wherein the failure is a rupture of the at least one diaphragm.

9. The pilot actuator of claim 6, wherein a piston is disposed in the neutral chamber.

10. The pilot actuator of claim 1, wherein the housing includes a first portion that corresponds to the first chamber and a second portion that corresponds the second chamber, and
wherein the pilot actuator further comprises a spacer disposed between the first portion and the second portion, the spacer disposed so as to align with the actuator assembly and defining at least a portion of the neutral chamber.

11. The pilot actuator of claim 10, wherein a vent is formed in the spacer.

12. The pilot actuator of claim 1, further comprising:
at least one biasing member disposed between the interior surface of the second chamber and the actuator assembly to bias the actuator assembly toward an open position.

13. The pilot actuator of claim 12, wherein the at least one biasing member circumscribes the actuator seat.

14. The pilot actuator of claim 12, wherein the at least one biasing member comprises at least one coil spring having a first end engaged with a portion of the interior surface of the second chamber and a second end engaged with a portion of the actuator assembly that faces the actuator seat.

15. The pilot actuator of claim 12, wherein the at least one biasing member has a spring constant in a range of 54 pound-force/inch to 66 pound-force/inch.

16. The pilot actuator of claim 1, wherein the actuator seat is centered about a central axis of the pilot actuator.

17. The pilot actuator of claim 1, wherein gas pressure from the measurement port is exerted on the actuator assembly to move the actuator assembly to the actuator seat, and
wherein a ratio of an effective area of the exerted gas pressure on the actuator assembly to a cross-sectional area of the channel is in a range of 225 to 275.

18. The pilot actuator of claim 1, wherein the channel has a diameter in a range of 0.20 inch to 0.24 inch.

19. A fire suppression system, comprising:
a control valve for supplying fire suppression fluid to a sprinkler piping network, the control valve including a prime chamber with a control valve diaphragm for controlling a flow of the fire suppression fluid to the sprinkler piping network; and
a pilot actuator for operating the control valve, the pilot actuator including,
a housing defining an interior chamber,
an actuator assembly disposed in the interior chamber and dividing the interior chamber into a first chamber and a second chamber,
a gas measurement port for fluid communication between the first chamber and at least one component in the sprinkler piping network, the at least one component being pressurized with a compressed gas,
an output port for draining fluid from the second chamber,
an inlet port for selective communication between the second chamber and the prime chamber of the control valve, and
an actuator seat disposed along an interior surface of the second chamber, the actuator seat having a channel in fluid communication with the inlet port, the actuator seat configured to fluidly isolate the inlet port from the second chamber when the actuator assembly contacts and is contiguous with the actuator seat, and the actuator seat further configured to permit fluid flow between the inlet port and the second chamber when the actuator assembly is disposed away from the actuator seat,
wherein the actuator assembly defines a neutral chamber that is at an intermediate pressure in comparison to pressures at the inlet port and the gas measurement port when the pilot actuator is in a stand-by state.

20. The system of claim 19, wherein a portion of the housing includes a vent that provides fluid communication between the neutral chamber and atmosphere, and
wherein the intermediate pressure is atmospheric pressure.

21. The system of claim 20, wherein the vent is formed in the portion of the housing corresponding to the actuator assembly.

22. The system of claim 19, wherein the neutral chamber aids in the operation of the actuator assembly to one of fluidly isolate the inlet port from the second chamber or permit fluid flow between the inlet port and the second chamber.

23. The system of claim 19, wherein the intermediate pressure in the neutral chamber aids in an operation of the actuator assembly such that a ratio of a change in a trip pressure set point to a change in an inlet pressure at the inlet port is in a range of 0.007 to 0.045.

24. The system of claim 19, further comprising:
a fluid supply assembly for suppling the fire suppression fluid to the prime chamber of the control valve,
wherein the actuator assembly and the fluid supply assembly are configured such that the fluid flow from the prime chamber through the pilot actuator when the pilot actuator is open is at a higher volumetric flow than the fire suppression fluid being supplied to the prime chamber by the fluid supply assembly.

25. The system of claim 19, wherein the actuator assembly includes at least one diaphragm disposed in the interior chamber for defining at least a portion of the neutral chamber.

26. The system of claim 25, wherein the neutral chamber is configured to identify a failure in the pilot actuator.

27. The system of claim 26, wherein the failure is a rupture of the at least one diaphragm.

28. The system of claim 25, wherein a piston is disposed in the neutral chamber.

29. The system of claim 19, wherein the housing includes a first portion that corresponds to the first chamber and a second portion that corresponds the second chamber, and
wherein the pilot actuator further comprises a spacer disposed between the first portion and the second portion, the spacer disposed so as to align with the actuator assembly and defining at least a portion of the neutral chamber.

30. The system of claim 29, wherein a vent is formed in the spacer.

31. The system of claim 19, further comprising:
at least one biasing member disposed between the interior surface of the second chamber and the actuator assembly to bias the actuator assembly toward an open position.

* * * * *